UNITED STATES PATENT OFFICE.

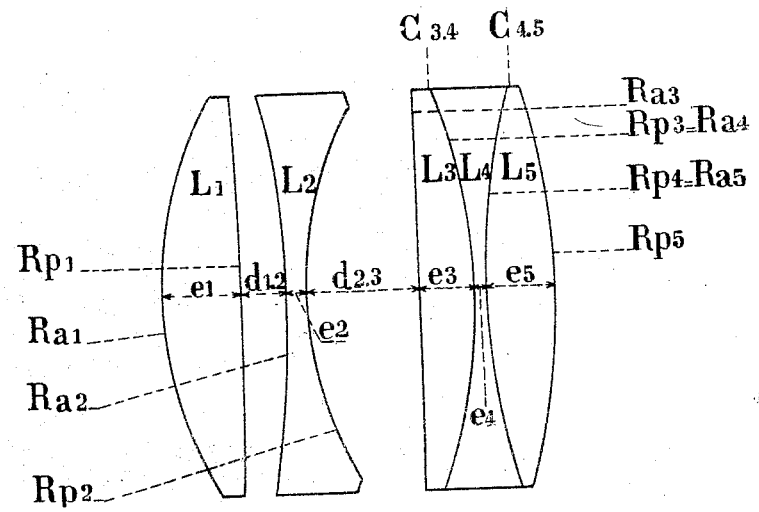

CHARLES HENRI FLORIAN, OF PARIS, FRANCE, ASSIGNOR TO SOCIÉTÉ ANONYME DES ETABLISSEMENTS LACOUR-BERTHIOT, OF PARIS, FRANCE.

OBJECTIVE.

1,122,895.    Specification of Letters Patent.   Patented Dec. 29, 1914.

Application filed June 4, 1913.  Serial No. 771,691.

*To all whom it may concern:*

Be it known that I, CHARLES HENRI FLORIAN, of 9 Rue Froissart, in the city of Paris, Republic of France, have invented an Objective, of which the following is a full, clear, and exact description.

The invention relates to an objective having a very considerable numerical opening, an extended field and a definition of high value.

The new objective is constituted by two groups of lenses, separated by the diaphragm. The front group comprises two separated lenses the whole of which presents a negative spherical aberration. The second group is constituted by three combined lenses presenting a notable positive aberration which compensates the aberration of the first group.

The accompanying drawing, given by way of example only, illustrates diagrammatically the new objective.

The first lens $L_1$ of the front group is highly convex at the front and slightly convex or even plane at the rear. The second lens is biconcave; the film of air between these two lenses is therefore of divergent character.

The index of refraction of the first lens is greater than that of the second lens:

$$n_1 > n_2$$

On the other hand, these indices satisfy the inequality:

$$\frac{\Delta n_1}{n_1 - 1} < \frac{\Delta n_2}{n_2 - 1}$$

$\Delta n$ designating the difference of the indices for the two spectral rays between which the achromatism is to be corrected.

The group of the two lenses $L_1$ $L_2$ may be a focal or even divergent; it is over-corrected from the spherical aberration so as to present a negative aberration.

The second group constitutes a semi-normal combination; it comprises two converged elements $L_3$ $L_5$ separated by a divergent element $L_4$. These three elements $L_3$ $L_4$ $L_5$ are put together, as shown in the drawing.

The indices of refraction satisfy the following conditions:

$$n_5 > n_4 > n_3$$

and $$\frac{\Delta n_3}{n_3 - 1} < \frac{\Delta n_5}{n_5 - 1} < \frac{\Delta n_4}{n_4 - 1}$$

If we consider the whole of the elements, we must have:

$$n_1 \geqslant n_5 > n_2 > n_4 > n_3$$

and $$\frac{\Delta n_3}{n_3 - 1} < \frac{\Delta n_1}{n_1 - 1} \leqslant \frac{\Delta n_5}{n_5 - 1} < \frac{\Delta n_4}{n_4 - 1} < \frac{\Delta n_2}{n_2 - 1}$$

Contrary to the system generally used which it was endeavored to correct, the present system constituted by the lenses $L_3$ $L_4$ $L_5$ possesses a notable positive spherical aberration adapted to compensate the negative aberration of the first group of lenses.

The film of air $d_{1 \cdot 2}$ and the surface $c_{3 \cdot 4}$ add their negative aberrations which are compensated by the whole of the convergent surfaces of the objective. By this fact and by the disposition of the elements of this objective, the corrections are rendered easy without being compelled to resort to curved surfaces such as in the ordinary systems. At the same time, by reason principally of the diminution of the curvatures, the zonal aberrations are considerably diminished.

The new objective is principally intended for photography and projection purposes; it is particularly suitable for taking instantaneous or rapid views or with a small light in which considerable sharpness is desired. It is also suitable for projections or reproductions in which the same conditions must be realized. It is also advantageous when it is desired to avoid heating in an exaggerated manner the object to be projected, film or plate. The new objective is therefore particularly suitable for the two reverse operations of the kinematography.

By way of example, the following values may be indicated:

F = 100
Ra₁ = 28.8
Rp₁ = 525
Ra₂ = 75.1
Rp₂ = 27.7
Ra₃ = 455
Rp₃ = Ra₄ = 42.6
Rp₄ = Ra₅ = 47.7
Rp₅ = 50.5

$e_1 = 5.7$
$e_2 = 1.3$
$e_3 = 4$
$e_4 = 1.75$
$e_5 = 4.1$ $d_{1-2} = 7$
$d_{2-3} = 12.1$ $n_1 = 1.6228$
$n_2 = 1.6743$
$n_3 = 1.5002$
$n_4 = 1.5328$
$n_5 = 1.6228$ $Ra$ being the front radius, $Rp$ being the back radius, $n$ being the index of refraction, $e$ being the thickness of the lenses, $d$ being the thickness of the films of air, $F$ being the focal distance, $\Delta n$ being the variation of $n$ between the lines for which the achromatism is effected.

The objective established according to these data presents a numerical opening equal to F:4, a field equal to 55° and the definition at the center is equal to ⅔ of the theoretical definition.

The numerical values above indicated are only given by way of example and may vary in sufficiently large limits as well as the relative opening, provided the general conditions set forth are observed.

Claims:

1. An objective formed of two groups of lenses, the first group comprising two separated lenses the whole of which presents a negative spherical aberration, the second group comprising three combined lenses presenting a notable positive aberration which compensates the negative aberration of the first group.

2. An objective comprising a group of two lenses and a group of three lenses, the first, the fifth, the second, the fourth and the third lens having indices of refraction of decreasing values, that of the first and that of the fifth lens may at the limit be equal, while the quotients of the variations of the indices between the spectral rays for which the achromatism is corrected, and the indices minus one unit, decrease from the third to the first, to the fifth, to the fourth and to the second lens, these quotients may at the limit be equal for the first and the fifth lens.

The foregoing specification of my objective signed by me this tenth day of May 1913.

CHARLES HENRI FLORIAN.

Witnesses:
 HANSON C. COXE,
 RENÉ THIRIOT.